Feb. 15, 1927.
K. N. VARTABEDIAN
DISPENSING DEVICE
Filed April 22, 1926
1,618,118
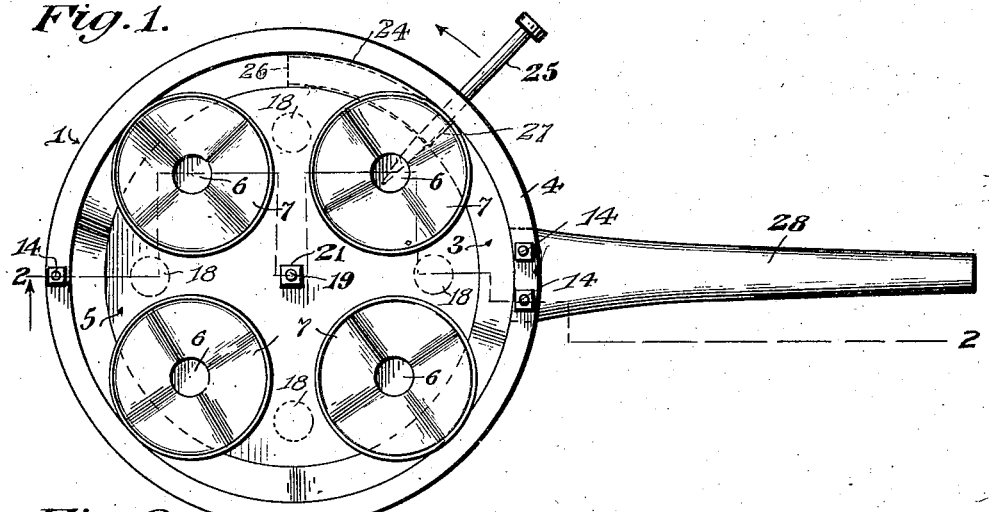
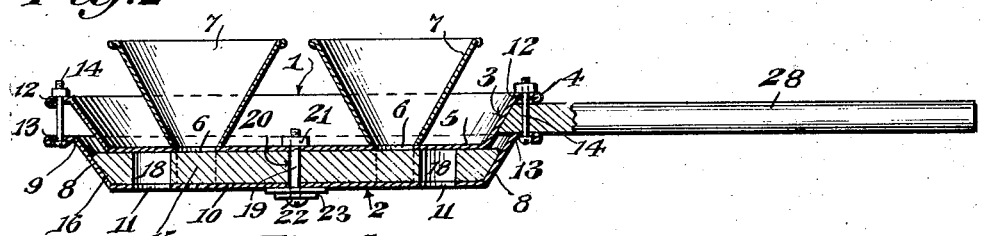
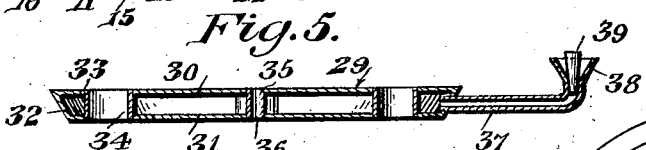
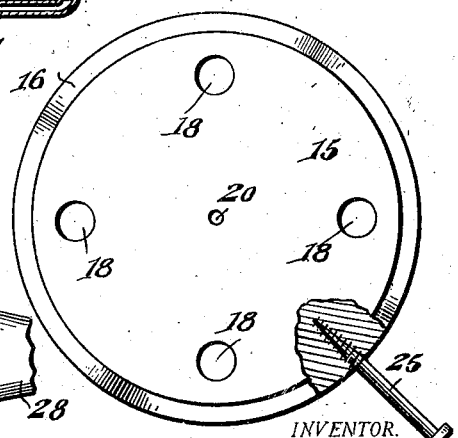
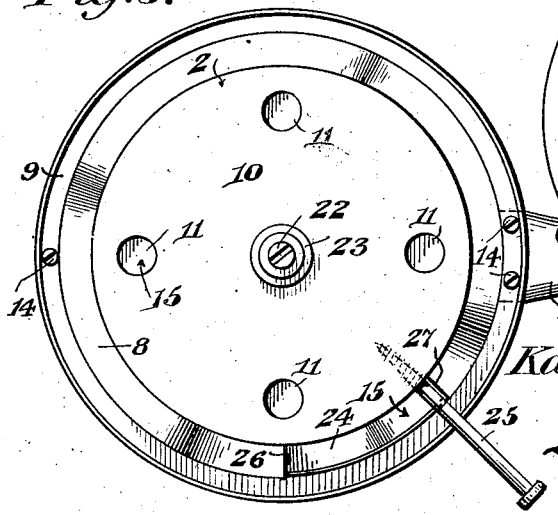
INVENTOR.
Katusd N. Vartabedian,
BY
Geo. P. Kimmel.
ATTORNEY.

Patented Feb. 15, 1927.

1,618,118

UNITED STATES PATENT OFFICE.

KALUSD N. VARTABEDIAN, OF CHICAGO, ILLINOIS.

DISPENSING DEVICE.

Application filed April 22, 1926. Serial No. 103,916.

This invention relates to a dispensing device designed primarily for use in the method of manufacturing of an article of food as set forth in my application Serial No. 103,949, filed Apr. 22, 1926, but it is to be understood that a dispensing device, in accordance with this invention, can be employed for any purposes for which it is found applicable, and the invention has for its object to provide, in a manner as hereinafter set forth, a device of the class referred to for dispensing bulks of liquid dough into hot frying medium therefor.

A further object of the invention is to provide, in a manner as hereinafter set forth, a device of the class referred to for dispensing therefrom, bulks of liquid dough of predetermined size to be acted upon by a frying medium for the dough or otherwise for dropping predetermined sized bulks of liquid dough into a frying medium therefor.

Further objects of the invention are to provide, in a manner as hereinafter set forth, a device of the class described, which is simple in its construction and arrangement, strong, durable, compact, thoroughly efficient in its use, conveniently operated, and comparatively inexpensive to manufacture.

With the foregoing and other objects in view the invention consists of the novel construction, combination and arrangement of parts as hereinafter more specifically described and illustrated in the accompanying drawings, wherein is shown an embodiment of the invention, but it is to be understood that changes, variations and modifications can be resorted to which fall within the scope of the claims hereunto appended.

In the drawings wherein like reference characters denote corresponding parts throughout the several views:

Figure 1 is a top plan view of a dispensing device in accordance with this invention.

Figure 2 is a section on line 2—2, Figure 1.

Figure 3 is an inverted plan thereof.

Figure 4 is an inverted plan view of the controlling valve.

Figure 5 is a cross sectional view or modified form of controlling valve.

The dispensing device as illustrated is provided with means for simultaneously dispensing four bulks of liquid dough, but it is to be understood that the number of bulks dispensed can be increased or decreased.

The device includes a pair of superposed, spaced, stationary shallow receptacles, referred to generally by the reference characters 1 and 2. The receptacle 1 consists of a flaring body portion 3 of appropriate height provided at its top with a right angularly disposed continuous rim 4. The receptacle 1 further includes a bottom 5 formed with hollow equi-distant spaced openings 6 providing outlets for a series of containers 7. The containers 7 are of greater height than the body portion 3, are open at the top and bottom thereof, and each container has its lower end fixedly secured to the bottom 5 of the receptacle 1, and the open bottom of the container registers with an outlet 6. The receptacle 1 is of circular contour.

The receptacle 2 comprises a body portion 8 of flaring contour and of the same height as the body portion 3 of the receptacle 1. The body portion 8 has projecting from its top thereof a right angularly disposed continuous rim 9. The receptacle 2 further includes a bottom 10 formed with a series of openings 11 which are spaced equi-distant with respect to each other and provide discharge points for the dough. The openings 11 are so disposed with respect to the openings 6 as to be positioned in the same arc as the arc of these latter. That is to say the openings 6 are arranged in a circular row as well as the openings 11, but with the openings 6 alternately disposed with respect to the openings 11.

The rim 4 as well as the rim 9 is apertured and the apertures of one rim aline with the apertures in the other rim. The apertures in the rim 4 are indicated at 12 and the apertures in the rim 9 are indicated at 13. Hold fast devices 14 are employed for fixedly connecting the receptacles 1 and 2 together, and said hold fast devices extend through the openings 12 and 13, and each consists of a headed bolt provided with a clamping nut. The heads of the bolts abut against the lower face of the rim 9 and the nuts carried by the bolts are positioned to abut against the upper face of the rim 4, and by this arrangement, when desired, the receptacles 1 and 2 can be disconnected from each other.

Interposed between the bottoms 5 and 10 is a controlling valve 15, preferably constructed of wood, and having a bevelled edge 16 which rides against the inner face of the body portion 8 of the receptacle 2. The valve 15 maintains the receptacles 1 and 2 in spaced relation. The valve 15 is formed with a series of equi-distant openings 18 so disposed that when they register with the openings 6 the valve 15 will close the openings 11, but when the openings 18 register with the openings 11, the valve 15 will close the opening 6. The openings 18 provide what may be termed pockets for the reception of bulks of liquid dough received from the containers 7.

The valve 15 is shiftably mounted between the bottoms 5 and 6, and swings upon a vertical axis or pivot bolt as indicated at 19. An opening 20 is provided in the valve 15 for the passage of the bolt 19. The bolt 19 carries a securing nut 21 on its upper end which abuts against the upper face of the bottom 5 of the receptacle 1. The bolt 19 depends below the bottom 10 of the receptacle 2, and has mounted on the head 22 thereof, a plurality of washers 23 positioned to abut against the lower face of the bottom 10 of the receptacle 2. Extending radially from the valve 15 and through an opening 24, formed in the body portion 8, is a handle member 25 to facilitate the oscillatory movement of the valve 15. The end walls 26 and 27 of the slot 24 provides stops for arresting the shifting movement of the valve 15 in either direction and further provides means to cause the registration of the openings 18 with the opening 6 and the registration of the openings 18 with the openings 11. When the handle 25 engages the end wall 27, the openings 18 will register with the openings 11 and when the handle 25 engages the end wall 26 the openings 18 will register with the openings 6. By this arrangement registration of the openings are provided. A handle member 28 projects laterally from the rims 4 and 9 and which is employed for suspending the dispensing device over the frying medium for the bulks of dough which are dropped into said medium or said bulks of dough can be dropped at any other desirable point. The handle member 28 abuts against the body portion of the receptacle 1 and said handle member is fixedly secured to the rims 4 and 9 by certain of the hold-fast devices 14.

In Figure 4 of the drawings a modified form of controlling valve is disclosed and which is hollow to receive a cooling medium. The valve shown in Figure 5 is indicated at 29 and includes a top 30, a bottom 31 and a body portion 32, the latter being flared. The top 30 is of greater diameter than the bottom 31 and said top and bottom are formed integral with the body portion 32. The top 30 and bottom 31 are provided with openings and the openings of the top 30 register with the openings in the bottom 31. The openings in the top 30 and bottom 31 are indicated at 33. Secured to the top 30 and bottom 31 and extending into the openings 33 is a sleeve 34. The said sleeve provides pockets for the reception of the bulks of dough and the upper ends of the sleeves 34 are adapted to register with the openings 6, in the bottom of the receptacle 1 and are furthermore adapted to have their lower ends register, when the valve is shifted, with the openings 11, formed in the bottom 10 of the receptacle 2. The top 30, as well as the bottom 31 is furthermore provided with an opening and the said openings register and are indicated at 35. A sleeve 36 is secured to said tops and bottom and extends into the registering opening 35 and through said sleeve or tube extends the pivot bolt 19. Projecting from the body portion 32, as well as being fixedly secured therewith and communicating with the interior thereof, is a hollow handle 37, provided with a funnel 38 at its outer end and with the funnel disposed at right angles with respect to the major portion of the handle 37. A closure plug 39 is provided for the funnel 38. When the plug 39 is removed the body portion can be supplied with a cooling medium. The handle member 37 is employed for the same purpose as the handle 25.

It will be assumed that the dispensing device is in the position as shown in Figure 2 and when in such position the valve closes the openings 6. The containers 7 have been supplied with a liquid dough. When the valve is shifted in one direction the openings 18 are brought to register with the openings 6, and when in such position, the valve closes the openings 11. When the openings 18 register with the openings 6, the liquid dough is supplied into each of said openings 18. The valve is then shifted, cutting off the supply of liquid dough from the containers, as well as closing the openings 6, and on the further shift of the valve, the openings 18 are brought into registration with the openings 11, and the bulks of dough carried by the valve are discharged through the openings 11 into the frying medium for the bulks or at any other point desired.

It is thought that the many advantages of a dispensing device, in accordance with this invention and for the purpose set forth, can be readily understood, and although the preferred embodiment of the invention is as illustrated and described, yet it is to be understood that changes in the details of construction can be had which will fall within the scope of the invention as claimed.

What I claim is:

1. A manually held liquid dough dispensing device comprising a pair of open top, shallow, tapered, stationary receptacles arranged in superposed spaced relation and one extending into the other, each of said receptacles having its bottom provided with a plurality of openings, the openings in one of said bottoms normally arranged out of alinement with respect to the openings in the other of said bottoms, upstanding containers secured to the bottom of the upper receptacle, each open at its upper and lower ends and having its lower end registering with an opening in the bottom of the upper receptacle, an oscillatory controlling element interposed between the bottoms of said receptacles and provided with means for alternately receiving material from said containers and dispensing the same through the openings in the bottom of the lower receptacle, and a handle member extending between and connected to said receptacle.

2. A manually held liquid dough dispensing device comprising a pair of open top, shallow, tapered, stationary receptacles arranged in superposed spaced relation and one extending into the other, each of said receptacles having its bottom provided with a plurality of openings, the openings in one of said bottoms normally arranged out of alinement with respect to the openings in the other of said bottoms, upstanding containers secured to the bottom of the upper receptacle, each open at its upper and lower ends and having its lower end registering with an opening in the bottom of the upper receptacle, an oscillatory controlling element interposed between the bottoms of said receptacles and provided with means for alternately receiving material from said containers and dispensing the same through the openings in the bottom of the lower receptacle, a handle member extending between and connected to said receptacle, and a pivot member connected with the bottoms of said receptacles extending through said controlling element axially thereof.

3. A manually held liquid dough dispensing device comprising a pair of open top, shallow, tapered, stationary receptacles arranged in superposed relation and one extending into the other, each of said receptacles provided with a plurality of openings in the bottom thereof, the openings in one of said bottoms arranged out of alinement with respect to the openings in the other of said bottoms, tapered upstanding containers secured to the bottom of the upper receptacle, each open at its top and bottom and having its bottom registering with an opening formed in the bottom of the upper receptacle, an oscillatory controlling element interposed between the bottoms of said receptacles and provided with means for alternately receiving material from the containers and dispensing the same through the openings in the lower receptacle, said receptacles at their tops being flanged, and a handle member extending between said flanges and connected thereto.

4. A manually held liquid dough dispensing device comprising a pair of open top, shallow, tapered, stationary receptacles arranged in superposed spaced relation and one extending into the other, each of said receptacles having its bottom provided with a plurality of openings, the openings in one of said bottoms normally arranged out of alinement with respect to the openings in the other of said bottoms, upstanding containers secured to the bottom of the upper receptacle, each open at its upper and lower end and having its lower end registering with an opening in the bottom of the upper receptacle, an oscillatory controlling element interposed between the bottoms of said receptacles and provided with means for alternately receiving material from said containers and dispensing the same through the openings in the bottom of the lower receptacle, a handle member extending between and connected to said receptacle, the said means of said controlling element including a plurality of openings corresponding in number to the number of openings formed in either one of said bottoms.

5. A manually held liquid dough dispensing device comprising a pair of open top, shallow, tapered, stationary receptacles arranged in superposed spaced relation and one extending into the other, the bottom of each of said receptacles provided with a plurality of openings, the openings of one of said bottoms arranged out of alinement with the openings in the other of said bottoms, upstanding containers secured to the bottom of said upper receptacle and corresponding in number to the number of openings in the bottom of such receptacle, each of said containers open at its top and bottom and having its bottom registering with one of the openings in the bottom of the upper receptacle, an oscillatory controlling element interposed between the bottoms of said receptacles and provided with means for alternately receiving material from said containers dispensing the same through the openings in the bottom of the lower receptacle, said lower receptacle formed with a slot and said element including means extending through the slot to provide for the manual shifting of the element, a handle member connected to said receptacles, and a pivot member connected with the bottoms of said receptacles and extending through said controlling element axially thereof.

In testimony whereof, I affix my signature hereto.

KALUSD N. VARTABEDIAN.